May 16, 1967 L. M. PALMER 3,319,655
TIME CONTROLLED DISTRIBUTOR VALVE MEANS
Filed March 13, 1964 2 Sheets-Sheet 1

INVENTOR.
LYNN M. PALMER
BY Robert R. Finch
ATTORNEY

May 16, 1967  L. M. PALMER  3,319,655
TIME CONTROLLED DISTRIBUTOR VALVE MEANS
Filed March 13, 1964  2 Sheets-Sheet 2

INVENTOR.
LYNN M. PALMER
BY Robert A. Finch
ATTORNEY

United States Patent Office 3,319,655
Patented May 16, 1967

3,319,655
TIME CONTROLLED DISTRIBUTOR
VALVE MEANS
Lynn M. Palmer, 510 West 3840 South,
Salt Lake City, Utah 84104
Filed Mar. 13, 1964, Ser. No. 351,678
2 Claims. (Cl. 137—624.18)

This invention relates generally to flow control apparatus including a valve having a single inlet and a plurality of outlets; and in particular to such apparatus in which flow from a single valve inlet is directed in timed sequence to a selected one or more of the outlets.

It is therefore a primary object of the invention to provide a flow control apparatus or system embodying a valve of particular construction having a single inlet and a plurality of separate outlets and having means for automatically directing the flow between the inlet and a selected one or more of the outlets in timed sequence.

It is a further object to provide apparatus attaining the foregoing object and of a construction low in initial cost and inexpensive of operation.

A still further object is the provision of a valve structure and a system embodying the same which attains the foregoing objects yet is adaptable to a wide variety of uses such as lawn watering, chemical distribution in automated process and the like.

In accordance with the invention, the apparatus includes a valve structure in which the valve itself is formed with a circular flat chamber, such as in a short closed cylinder having a disc rotatably mounted therein between its upper and lower surfaces to thereby define an inlet chamber on one side of the disc; and the disc is provided with one or more transverse passages or ports which, upon rotation of the disc, register sequentially with outlets leading from the outlet end of the body. An electrically controllable on and off valve regulates flow into inlet chamber; and means are provided for automatically rotating the disc to register with a selected successive outlet; and control means are provided to coordinate disc rotation with the on and off control of the inlet supply valve whereby rotation of the disc port between adjacent outlets is accomplished only when the flow of liquid to the chamber is cut off. In other words, flow to the valve is provided only when an outlet is in register with the disc port and the disc is motionless, i.e. its driving motor is deenergized or deprived of power. With this arrangement inlet pressure is applied to the valve only when it is properly positioned and is cut off during the shift to the next station thereby eliminating forces that would otherwise work against changing of the valve.

With such a structure, rotation between outlet ports is readily accomplished with minimum effort and expenditure of energy yet the desirable self-sealing feature of a disc valve is retained.

The foregoing and possibly other advantages will be apparent to those skilled in the field to which this invention pertains by a perusal of the accompanying drawings and the following description thereof, all of which are offered by way of example only and are not to be taken as limiting the invention, the scope of which is defined by the appended claims rather than by any detailed description.

Basically, the structure comprises a valve generally designated 11, a drive section generally designated 12, a distributer generally designated 13 and a control box generally designated 14.

Figures 1, 2:
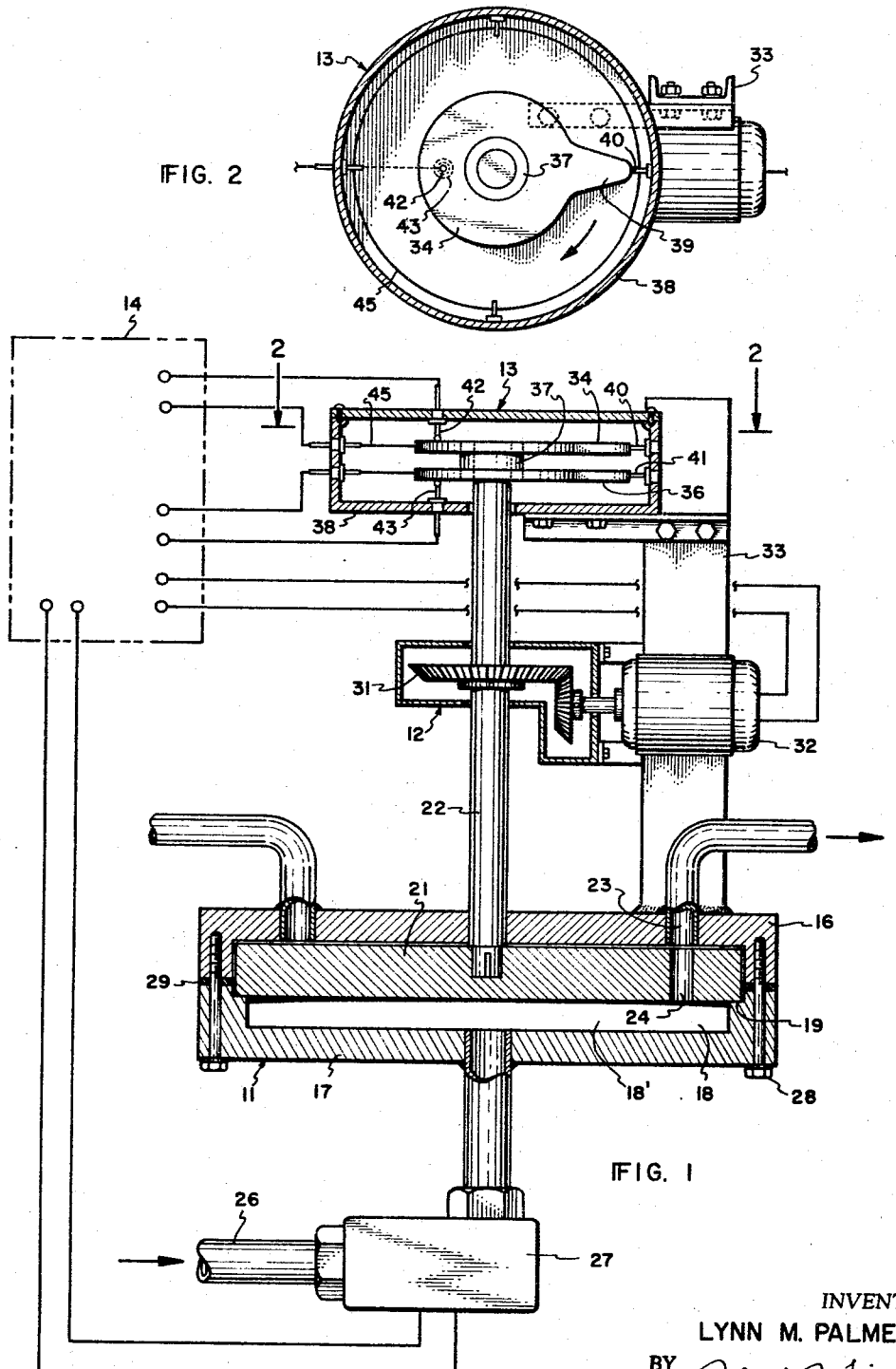
FIG. 1 is a side sectional view of a valve embodying the invention, certain parts being shown in elevation and others schematically for purposes of clarity.
FIG. 2 is a top plan view of the distributor mechanism employed in the valve of FIG. 1, the view being taken generally as looking in the direction of arrows 2 of FIG. 1.

As is best shown in FIG. 1, the valve comprises a closed cylindrical body formed from an upper section 16 and a lower section 17. The two sections define between them a chamber 18. The lower section 17 is provided with an annular shoulder 19 and a circular distribution or valve disc 21 is positioned in the chamber adjacent to and in face to face relationship to the outlet end of the chamber with the disc edge overlapping the shoulder.

A drive shaft 22 extends through the outlet end and is keyed to the center disc whereby the disc and shaft rotate together. The outlet end is also provided with a plurality of outlet ports 23 spaced angularly about the shaft axis and equidistant therefrom.

The valve disc is provided with a single passage or port 24 which provides communication between the inlet chamber below the disc and a selected outlet with which the port is in register. Although only one port is shown in the disc, a plurality may be employed if it is desired to have more than one outlet in operation at one time.

An inlet conduit 26 communicates through the bottom into the inlet chamber portion 18' as defined between the disc and the bottom. In this connection, it will be remembered that the disc is mounted to be at all times above the shoulder hence the inlet chamber 18' is permanently defined. This is important because it provides a pressure reservoir to insure forcing the disc against the valve top when the inlet is open. In this same connection, it is important that the disc be closely fitted into the recess of the valve to minimize leakage to the top side of the disc.

A solenoid on-off valve 27 is provided on the inlet conduit and, as is hereinafter described in greater detail, is tied into the control section to operate in conjunction with rotation and angular position of the disc.

In operation, water flowing through the inlet conduit into the valve chamber acts against the entire underside of the disc thus forcing it upwardly against the opposite end of the chamber and permitting liquid passage only through the port 24 when the latter is in register with one of the outlets. When the solenoid valve is closed, pressure in the chamber is released, thus eliminating friction between the disc and the upper section whereby the disc may be easily rotated to bring the port 24 into registration with a different outlet port. Also, as will be seen from a consideration of the control means of the invention, means are provided to prevent opening of the inlet valve unless the disc port is in registration with an outlet. This guards against overloading of the motor hence permits the use of a relatively inexpensive motor since high loads are eliminated.

In this connection, it is important that the inlet area be larger than the area of port 24 (or than the total open area of all ports if the disc has more than one) to insure a pressure drop sufficient to force the disc against and in sealing engagement with the top of the valve body.

As illustrated, the valve body itself may be held together by any suitable means such as bolts 28 and its water tight integrity insured by a suitable gasket 29.

The shaft 22 extends upwardly from the valve to the drive section 12 where it is keyed to a suitable drive gear 31 in turn connected through one or more speed reducing gears to an electric motor 32. The valve, motor and gear box may be combined by any suitable means such as a bracket 33.

The shaft 22, and thereby the disc, is also keyed to the rotors of the distributor 13. These include an upper rotor 34 and a spaced apart lower rotor 36. Although both rotors are keyed to the shaft for simultaneous rotation with it and the disc, they are mounted to be insulated from the shaft and from each other. In the illustrated embodiment, this is accomplished by use of a sleeve 37 of plastic or other insulating material fitted over and keyed to the shaft and on which in turn the rotors are concentrically fitted, provision being made to space the rotors apart from each other.

The rotors and spacers are, as shown, contained inside a distributor housing 38.

As shown in FIG. 2, each rotor has a contact arm 39 extending radially therefrom a sufficient distance to engage contact points 40 (upper rotor) and 41 (lower rotor) spaced around the periphery of the rotor housing. One contact (40 and 41) is provided at each level for each outlet. It should be noted that the contact points for each rotor are all connected to a common continuous wire or other conductor 45. The rotor itself is also a conductor and is continuously contacted on its surface by slide contacts 42 and 43 which engage the upper and lower rotors respectively. With this arrangement, the circuit between the peripheral contacts 40 and 41 and the contacts 42 and 43 are completed whenever the rotor arm 39 engages one of the peripheral contacts. The relation of the rotors and the contacts to the remaining circuitry is described in connection with FIG. 4.

Figure 4:
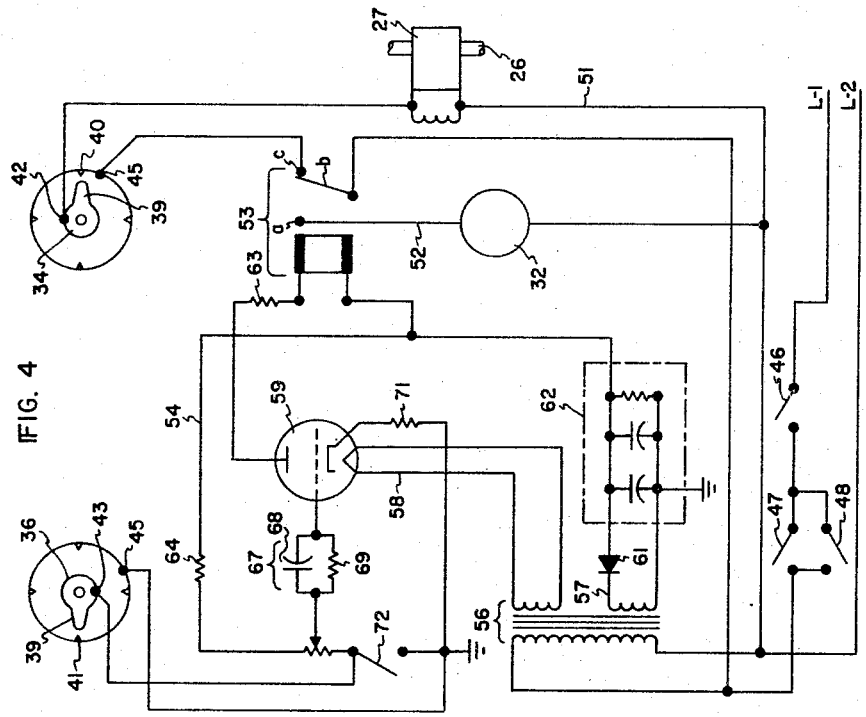
FIG. 4 is a circuit diagram illustrating a preferred circuitry for use with the controlled valve system of the invention.
Figure 3:
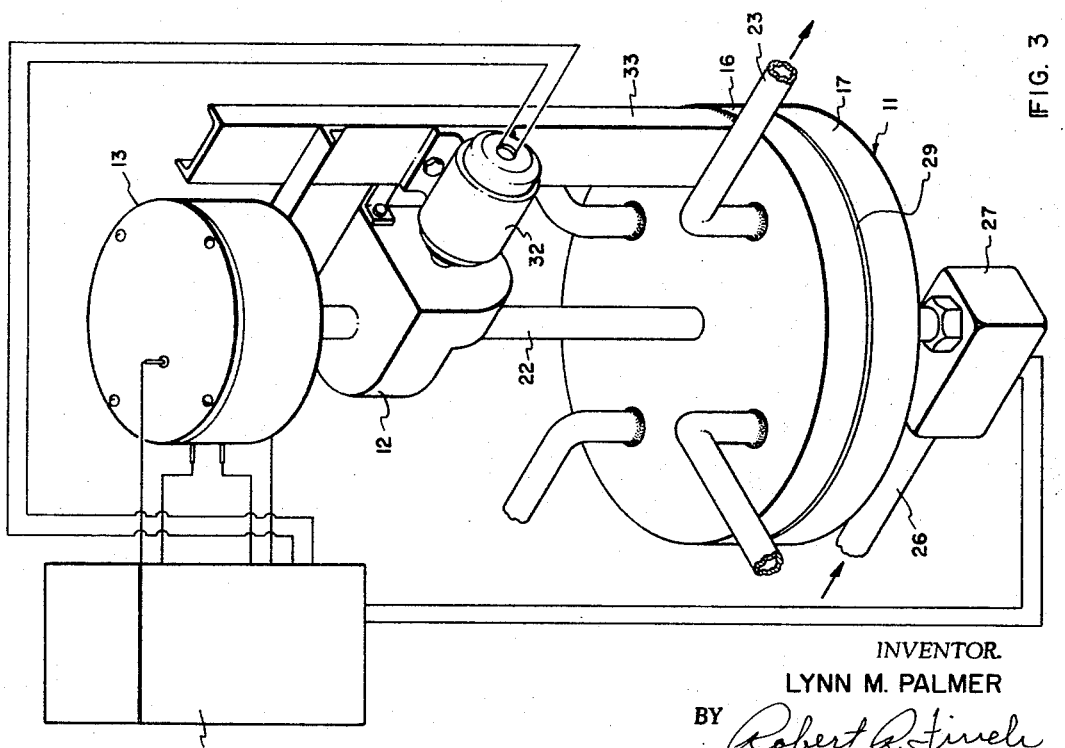
FIG. 3 is an isometric view of the structure of FIG. 1 illustrating with greater clarity juxtaposition of its various components.

Although FIG. 4 is a circuit diagram, parts corresponding to parts illustrated in FIGS. 1 to 3 are designated by identical reference numerals for ease of identification.

Basically, the control circuit is designed to provide a pre-set selected timed sequence of operation of disc rotation in combination with opening and closing of the inlet supply valve. Assuming the components to have just reached the positions shown in FIG. 1, the control circuit will be as shown in FIG. 4 and will operate to open the solenoid valve thus initiating flow into and through the chamber and the port 24 thence through the outlet 23. When the preset time interval has elapsed, the motor is energized simultaneously with closing of the solenoid valve and the disc is rotated to the next position. Upon reaching the next position the motor stops, and the solenoid valve opens and flow is re-initiated to continue for the preset time interval.

Power is supplied to the control circuit through lines L1 and L2. A master on and off switch 46 is provided for the current supply and there is additionally supplied a mechanically operated time switch 47 which may be set to close at a given time and remain closed for a given period of time. Any suitable switch available on the market may be employed for this purpose. A bypass switch 48 is provided to close the circuit during periods when the timed switch is in the open position.

Beyond the mainline switches 46–48 the circuit branches into two mainline circuits including circuit 51 for the solenoid valve 27 and 52 for the motor 32.

Circuit 51 is controlled between the open and closed condition, to thus control solenoid valve 27, by the upper rotor 34; and additionally by contacts $a$ and $b$ in a relay 53 in a separate branch control circuit 54 to be described hereinafter.

Circuit 52 is controlled between the open and closed condition to thus control motor 32 by contacts $b$ and $c$ of the previously mentioned relay 53.

The control circuit 54 is branched off the mainline beyond the mainline switches 56–48 independently of circuits 51 and 52 but is interrelated thereto as hereinafter described.

In the description of the control circuit the parenthetical descriptions have reference to elements actually employed in one embodiment of the invention but are not to be taken as limiting the invention because obviously other components equivalent in function may be employed without departing from the spirit of the invention.

The mainline current (115 v.) passes through an isolation transformer 56 and emerges in secondary circuits 57 and 58. Circuit 57 is at 150 volts and circuit 58 is at 6.3 volts.

Both secondary circuits connect to a vacuum tube 59 (6AU6 modified for triode operation), the low voltage circuit being directly connected thereto and the high voltage circuit through a rectitfier 61, a filter 62, a single pole double throw relay 53 (1500 ohm), and limiter resistor 63 (2500 ohm, 10 watt); and to the tube plate through a voltage divider resistor 64 (30,000 ohm, 10 watt), a variable potentiometer 66 (20,000 ohm) and a control element 67 comprising a capacitor 68 (8 microfarad-450 v. electrolytic) and a resistor 69 (10 meg.-½ watt) connected in parallel thence to vacuum tube grid. Beyond the potentiometer the circuit connects back to the tube cathode 59 through the lower rotor 36 (or bypass switch 72) and bias resistor 71 (700 ohm, 2 watt).

When the proper mainline switches (46 and 47 or 48) are closed the entire unit becomes operative. Circuit 51 will be energized to operate the solenoid valve to the open position provided the upper rotor 34 has closed the circuit between a contact 40 and contact 42 and the relay contacts $a$–$b$ are closed. The low voltage circuit starts to heat the tube filament; and when the filament is hot enough, sufficient current flows through the plate circuit to energize the relay 53 thus opening the circuit between contacts $a$ and $b$ and closing it between $b$ and $c$. With contacts $a$ and $b$ open, the solenoid valve closes to shut off the water supply. Closing contacts $b$ and $c$ closes the motor circuit 52 to start the motor and rotate the disc thus opening both circuits closed by the rotors. Opening the circuit controlled by the lower rotor disconnects the potentiometer from ground thus allowing grid current to flow from ground through the bias resistor 71 to the tube cathode thence to the grid and through resistor 69, the potentiometer and voltage divider resistor and finally to the power supply line. This flow charges capacitor 68 from the voltage drop across resistor 69. While the capacitor is charging, the tube continues to conduct current through the plate circuit and through the relay thereby holding relay points $b$ and $c$ closed to keep the motor running.

When the rotors reach the next contact position where the rotor arms engage the contacts, the potentiometer is grounded thus changing tube bias to a cut-off potential thereby depriving the relay 53 of energizing current whereupon contacts $b$ and $c$ break and contacts $a$ and $b$ close to complete the solenoid circuit 51 and open the valve to initiate water flow. Under these conditions, the capacitor gradually discharges through the shunt resistor 69 which gradually changes the bias in the tube grid until plate circuit currrent can reenergize the relay 53 to repeat the cycle.

It will be noted that the rotors turn with the disc and will close their respective circuits only when the disc port is registered with an outlet. Also, the solenoid cannot be energized while the motor is running because the relay 53 will close only one circuit at a time.

As noted, the time interval may be preselected; and this is done by varying the setting of the variable potentiometer which decreases or increases the amount of charge available to the capacitor 68 thus decreasing or increasing the time interval required for the charge to leak off through the shunt resistor 69 and allow the tube to become conductive with resultant energizing of the relay and operation of the motor.

From the foregoing it is evident that the invention presents a valve and control circuit which, because of its feature of blocking liquid inflow except when the valve port registers with an outlet, is adapted to a construction from inexpensive drive components without sacrifice in reliability of operation or longevity.

The control box may conveniently be located remote from the valve and power mechanism as may be desired in a permanent home installation, or the control box may be incorporated with the other components as a complete portable unit needing only a power supply for operation.

I claim:

1. Flow control apparatus comprising a closed cylindrical body having an inlet end provided with an inlet and an outlet end provided with a plurality of outlets spaced angularly about and equidistant from the center of said end, a circular valve disc rotatably mounted transversely in said body substantially filling its cross section, means in said body holding said disc adjacent said outlet end in face to face relationship therewith and spaced from said inlet end thereby to define an inlet chamber between said disc and said inlet end, a rotatable shaft fixed to the center of said disc to extend axially therefrom out one end of said cylindrical body whereby to effect rotation of said disc in said body, a port through said disc, said port being of smaller cross section than said inlet and located to move successively into and out of registration with said outlets upon rotation of said disc, a supply valve for controlling liquid flow to said inlet, control means for shifting said supply valve between the on and off position in response to rotation and position of said disc said control means comprising an electric motor for driving said shaft to rotate said disc, time delay means for energizing said motor at preset time intervals to rotate said disc to register said port with a selected succeeding outlet, switch means operable upon rotation of said shaft for deenergizing said motor upon arrival of said port in registration with said selected outlet and supply valve control means responsive both to energization of said motor and non-registration of said port with said outlet to shift said supply valve to the off position and to de-energization of said motor with said port aligned with an outlet to shift said valve to the on position.

2. Apparatus according to preceding claim 1 in which said control means includes a relay, said supply valve and supply valve control means comprise a normally off solenoid valve connectable to a source of power for shifting to the on position through one set of contacts of said relay only when said relay is de-energized, said motor is connected to a source of power through alternate contacts of said relay when said relay is energized, and said timer operates to energize said relay upon elapse of a preset time interval and to deenergize the same upon arrival of said port in registration with said selected succeeding outlet.

References Cited by the Examiner

UNITED STATES PATENTS 2,619,105  11/1952  Hauser _____ 137—624.2 X
3,096,787  7/1963   Kayler _____ 137—624.13

ALAN COHAN, *Primary Examiner.*